United States Patent [19]

Kammiller

[11] Patent Number: 4,727,469

[45] Date of Patent: Feb. 23, 1988

[54] CONTROL FOR A SERIES RESONANT POWER CONVERTER

[75] Inventor: Neil Kammiller, Lakewood, Ohio

[73] Assignee: Reliance Comm/Tec Corporation, Chicago, Ill.

[21] Appl. No.: 29,216

[22] Filed: Mar. 23, 1987

[51] Int. Cl.[4] .................... H02H 7/122; H02M 7/537
[52] U.S. Cl. ........................................ 363/56; 363/98; 363/132
[58] Field of Search ................... 363/17, 56, 98, 132; 323/299; 361/18, 76, 85–87, 90–92; 315/DIG. 4, DIG. 7

[56] References Cited

U.S. PATENT DOCUMENTS

| | | | |
|---|---|---|---|
| 4,587,604 | 5/1986 | Nerone | 363/17 |
| 4,648,017 | 3/1987 | Nerone | 363/28 |
| 4,670,832 | 6/1987 | Park | 363/56 |
| 4,672,528 | 6/1987 | Park et al. | 363/98 |
| 4,680,693 | 7/1987 | Carron | 363/132 X |
| 4,694,383 | 9/1987 | Nguyen et al. | 363/98 X |

Primary Examiner—Peter S. Wong
Attorney, Agent, or Firm—Michael M. Rickin

[57] ABSTRACT

A series resonant power supply for supplying regulated power to an output from an unregulated input voltage. The power supply includes a control circuit. The control circuit causes the on device to be turned off when the resonant current amplitude becomes essentially zero. The control circuit includes a circuit which prevents the turning off of the on device for a predetermined period of time after it has been turned on, even if the resonant current amplitude goes to zero. The control circuit also includes a circuit for determining when any one of a number of undesirable conditions occurs in the input voltage and a further circuit which prevents the turning on of an off device based on load requirements when an undesirable condition has been detected. The control circuit also includes another circuit which causes the power supply to operate at a frequency dependent on load when the load is relatively heavy and at a second much lower frequency when the load is relatively light.

13 Claims, 5 Drawing Figures

CONTROL FOR A SERIES RESONANT POWER CONVERTER

BACKGROUND OF THE INVENTION

This invention relates to the art of power supplies and, more particularly, to a controller for a series resonant power converter of the switching regulator type.

Power converters are known in the art and typically serve to accept energy from an unregulated energy source, such as a voltage source, and derive therefrom a regulated voltage which is applied to a load circuit. The regulation function is performed by interposing a regulating device between the source of energy and the load circuit.

One form of regulating device known in the prior art includes switching type regulating devices interposed between the source of energy and the load. These operate in a discontinuous manner in controlling the rate of energy transmission and, hence, consume less power during the regulating operation than regulating devices of the variable impedance type. The switching device has two modes of operation, fully on and fully off. The switching device is periodically turned on for a time interval to permit energy transfer for purposes of maintaining the power output at a predetermined level.

Typically, such switching type regulating devices employed in power converters utilize semiconductor devices, such as power transistors, as the switching devices. These devices are turned fully on, or saturated, or fully off during operation. When fully on, the semiconductor devices are conducting and little or no power is dissipated. Also, when nonconducting or fully off no power is dissipated therein. Power is, however, dissipated in such a semiconductor device during the time interval of switching from a nonconducting condition to a conducting condition and vice versa. It is during the switching time interval that a substantial amount of power may be dissipated in such a semiconductor device, and if large enough this may severely damage the semiconductor device.

It is desirable to provide power converters of the switching type which are cost effective and which occupy a small amount of space. This, then, necessitates high frequency operation, such as in excess of 20 KHz and preferably at substantially higher frequencies, such as 250 KHz, while transferring large amounts of power, such as on the order of 200 watts or more. In order to achieve such high frequency operation of power switches, sinusoidal operation in the form of a series resonant converter has been employed as opposed to the squarewave operation typically employed in the prior art.

One such example of a series resonant converter including a control circuit therefor is shown in U.S. Pat. No. 4,648,017 entitled "Control Of A Series Resonant Converter" which issued on Mar. 3, 1987 and is assigned to the same assignee as is the present invention. As described in U.S. Pat. No. 4,648,017, the control operates to ensure that the then on FET is turned off only when minimal or zero resonant current is flowing in the resonant circuit. The off FET is then turned on based on load requirements.

It is desirable to include in the control, circuit means which inhibits the false turning off of the then on FET. Noise in the resonant current may give rise to a false indication of zero or minimal resonant current to thereby cause the on FET to be prematurely turned off. Such premature turnoff endangers the operation of the FETs by causing them to switch current. This is not the intended mode of operation for the FETs.

It is also desirable to include means for obtaining a minimum deadtime between the turnoff of the on FET and the start of the sequence to develop a signal from the driver circuit to turnon the off FET and the actual generation of that signal.

It is further desirable to include means which provides for an orderly shutdown of the supply in the event of the occurrence of certain predetermined conditions which require a shutdown. This assures that the supply is shutdown only after the resonant current has become zero.

As described in U.S. Pat. No. 4,648,017 the FETs are turned on at a rate which depends upon load. The frequency of occurrence of the resonant current pulses becomes lower as the load becomes lighter. If the load is light enough the frequency of occurrence of the resonant current pulses becomes low enough to fall within the audible range of frequencies. That is undesirable. Therefore it is desirable to include in the supply, circuit means which limits the operating frequency at light loads such that it is not within the audible range of frequencies. One such example of such circuitry is shown in U.S. Pat. No. 4,587,604 entitled "Power Supply Employing Low Power and High Power Series Resonant Circuits" and which issued on May 6, 1986. That patent is assigned to the same assignee as is the present invention. The supply shown therein includes both low power and high power series resonant circuits. Both circuits operate when the load is heavy. The high power circuit is controlled to cease its operation when the load decreases to a certain level.

SUMMARY OF THE INVENTION

A control system for use in a series resonant power supply of the type which supplies regulated power to an output circuit from an unregulated input voltage. The power supply includes a series resonant circuit which has first and second switching devices. Each of the switching devices are actuable on and off with only one being on at any one time. The resonant circuit produces a resonant current when the switching means are actuated on and off.

The control circuit has a driver circuit for generating signals to actuate the switching devices on and off. Also included is a circuit which generates an actuating signal to cause the driver circuitry to actuate on one of the switching devices.

In a first embodiment the control circuit also comprises a circuit which is connected to the driver circuit to cause the same to actuate off that one of the switching devices which is then on only when the resonant current amplitude becomes essentially zero. The control circuit also has a circuit which is connected to both the on actuating circuit and the off actuating circuit. That circuit responds to the on actuating circuit causing the driver circuit to actuate on one of the switching means to prevent the off actuating circuit from causing the driver circuit to actuate off the then on switching device for a predetermined period of time, even if the resonant current amplitude becomes essentially zero.

In a second embodiment the control circuit also has a circuit which responds to the unregulated input voltage to determine when any one of a predetermined number of undesirable conditions occur in that voltage. The on actuating circuit has a circuit which responds to the occurrence of one of the undesirable conditions to inhibit the on actuating circuit from causing the driver circuit to actuate on one of the switching devices.

In yet another embodiment the power supply generates a signal representative of the loading conditions at its output. The control circuit has a low power control which is connected to the on actuating circuit. The control also has a further circuit which connects the signal representative of loading conditions to the on actuating circuit and the low power control. That circuit disconnects that signal from the on actuating circuit when the loading conditions are at or below a predetermined level. The on actuating circuit responds to the representative signal and generates on actuating signal whose frequency depends on the loading conditions. The low power circuit responds to the representative signal and generates a signal which has an essentially constant amplitude when the loading conditions are above the predetermined level. It generates pulses of predetermined width and amplitude when the loading conditions fall below the predetermined level. The on actuating circuit responds to the pulses and generates an actuating signal with a fixed time duration.

DESCRIPTION OF THE PREFERRED EMBODIMENTS

Figure 1:
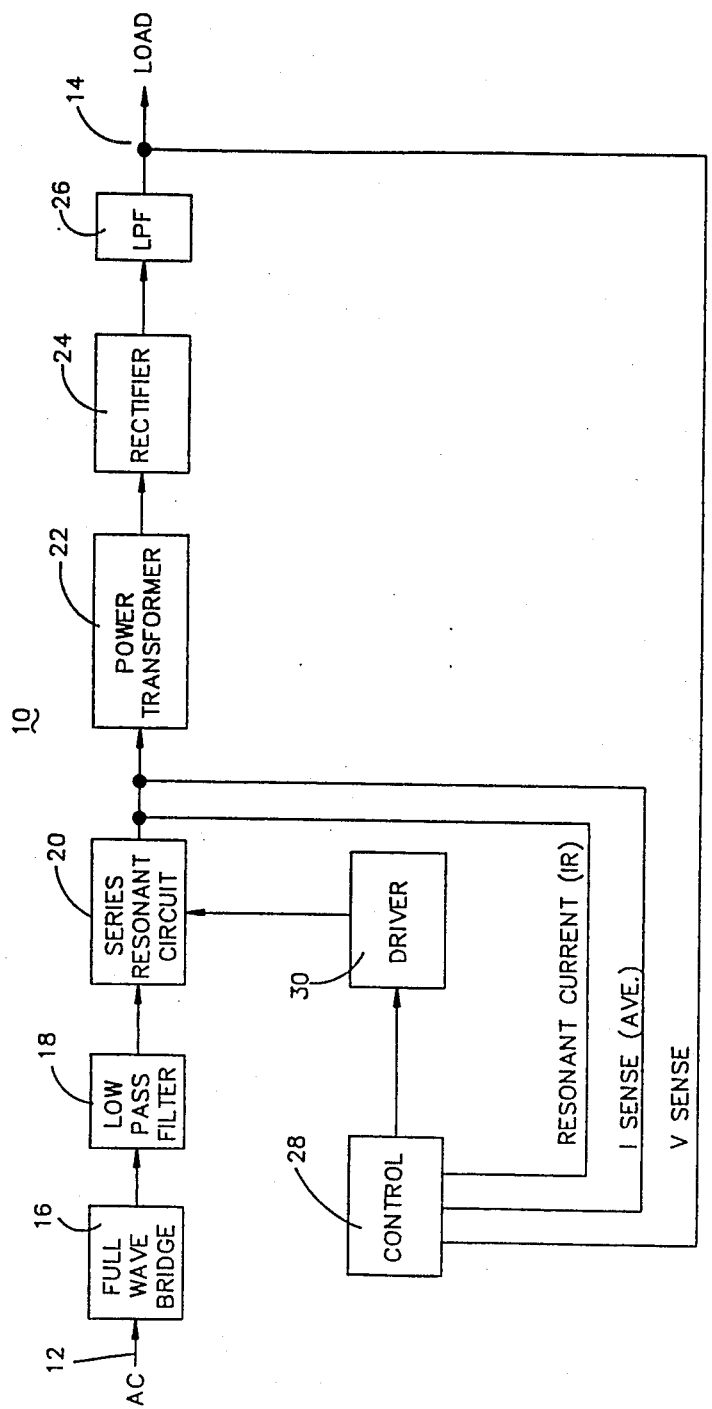
FIG. 1 is a block diagram illustrating a typical power supply of the series resonant type in which the present invention may be used.

Reference is now made to the drawings wherein the showings are for purposes of illustrating a preferred embodiment only. Referring now to FIG. 1, there is shown a block diagram of a high frequency power supply 10 which converts an AC voltage at its input 12 to a regulated DC voltage at its output 14. FIG. 1 in this application is identical to FIG. 1 of the aforementioned U.S. Pat. No. 4,648,017. This voltage conversion is achieved by first rectifying the AC voltage by means of a full wave bridge rectifier 16 and this rectified voltage is then filtered by a low-pass filter (LPF) 18 providing at the output of the filter an unregulated DC voltage.

Supply 10 includes a series resonant power circuit 20 which receives the unregulated DC voltage from the low-pass filter 18 and provides the regulated and isolated DC voltage at output terminal 14. As will be discussed in greater detail hereinafter, the circuit 20 includes a pair of power switches, preferably field effect transistors (FETs), which are arranged in a series half bridge configuration. These are alternately turned fully on and fully off through the use of a pulse position modulation (PPM) technique. In this technique, for stable input and output conditions pulses of constant width are applied to the gate electrodes of the FETs to turn them on for a fixed duration. It is the frequency at which these pulses are applied to the FETs that determines the transfer of power and which is controlled in accordance with the invention herein. The series resonant circuit includes the primary winding of the power transformer 22 and the secondary winding is coupled to the output by means of a rectifier 24 and a low-pass filter 26.

The switching of the FETs and therefore the operation of supply 10 is generally controlled as a function of either the voltage present at the output terminal 14 or the average current flowing in the primary winding of the power transformer 22. Ordinarily, the supply 10 operates in a voltage controlled mode to provide regulated DC voltage at output 14. As the load varies, the switching of the FETs is controlled to maintain the regulated output.

In addition to regulation based on loading, control 28 also responds to the average current flowing in the series resonant circuit. Consequently, the rate at which current pulses are applied through the power switches and, hence, the series resonant converter circuit is controlled to limit the magnitude of the average current and thereby prevent damage to sensitive power components such as FETs and rectifiers.

Additionally, as will be brought out in detail herein, the current pulses flowing through the series resonant circuit 20 are supplied at a frequency dependent upon the magnitude of the series resonant current flowing therethrough. It is these three input, output voltage, average current and resonant current that are supplied to the control 28 which, in turn, operates a driver circuit 30 to control the switching of the FETs in the series resonant converter.

Figure 2:
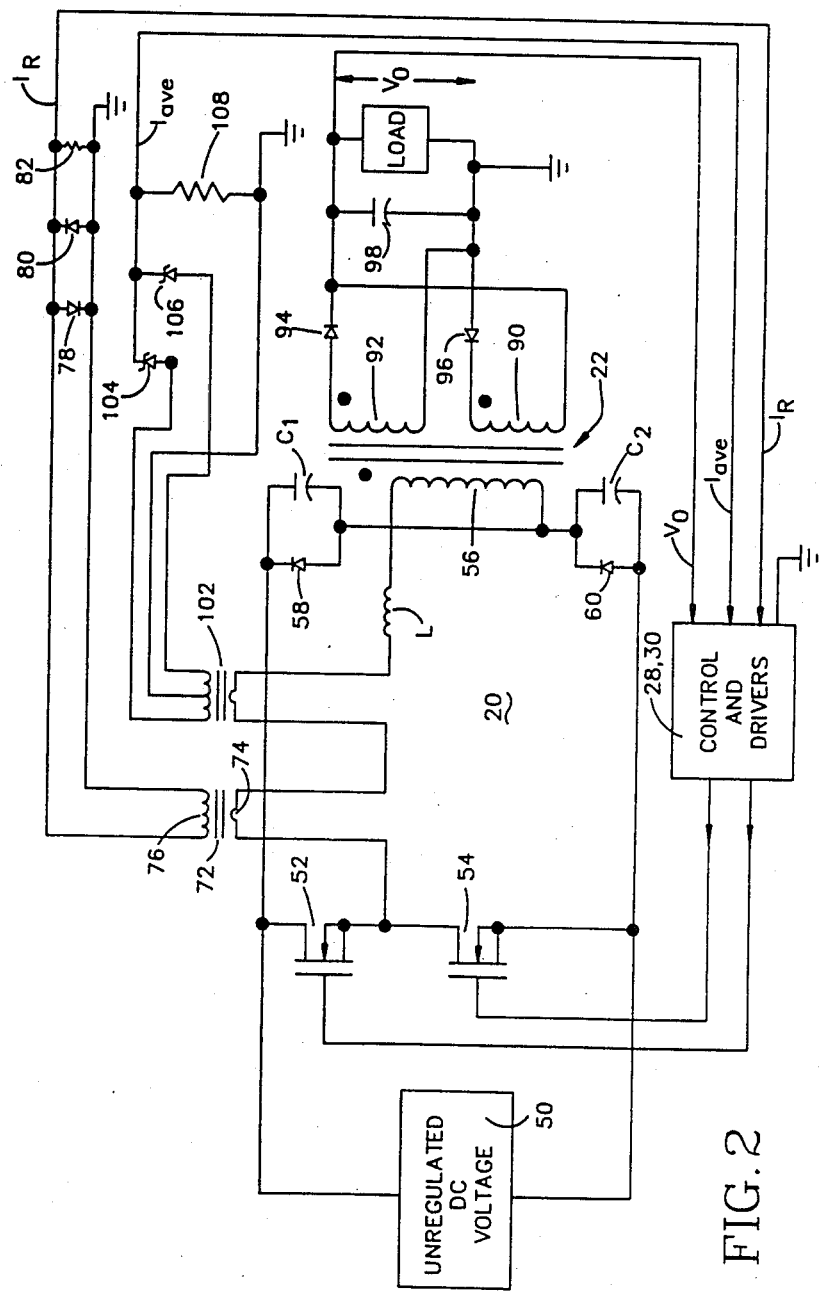
FIG. 2 is a schematic-block diagram illustration of the resonant converter and control therefor for the power supply shown in FIG. 1.

Having briefly described the operation of a power supply in conjunction with FIG. 1, attention is now directed to FIG. 2, which illustrates a tyical embodiment for the series resonant circuit 20 and the power transformer 22 in somewhat greater detail. FIG. 2 herein is substantially identical to FIG. 2 of the aforementioned U.S. Pat. No. 4,648,017. The input to the circuit 20 is shown in FIG. 2 as being an unregulated DC voltage 50 which is representative of the output of the low-pass filter 18 in FIG. 1. The circuit 20 includes a pair of field effect transistors 52 and 54 which are alternately gated into conduction, or fully on, by the converter control 28. Whenever one of the field effect transistors is turned on, it completes a path for current to flow from the voltage source 50 through a series resonant circuit including the primary winding 56 of power transformer 22 and a series inductor L together with one of two capacitors $C_1$ and $C_2$. Diodes 58 and 60 connected in parallel with capacitors $C_1$ and $C_2$, respectively, constrain the voltage excursions across these capacitors, thereby stabilizing the resonant tank circuit. The inductor L may be present in fact or it may represent the leakage reactance of the transformer.

In operation, as control 28 turns on one of the FETs 52 and 54, a current pulse flows through the resonant circuit. Each pulse has a rise time and fall time dependent on the components in the resonant tank circuit and appears in the form of a sinusoidal pulse. At steady state conditions, these pulses will be essentially sinusoidal and uniform in shape and have a fixed width and a fixed peak value. At low power, or low loading conditions, the current pulses occur at a low frequency of operation of the FETs 52 and 54. As demand increases for higher power operation, these pulses occur at a greater frequency. To achieve operation without the FETs 52 nd 54 being on at the same time, then the frequency of supplying the current pulses must be held to be somewhat less than that of a maximum resonant frequency $F_M$ which is determined by the components of the resonant tank circuit. Consequently, an off time between sinusoidal pulses may be substantial at low power requirements, but quite short during high power requirements. The minimum off time is also known as the dead time.

The switching on (or off) of such power switches can be accomplished during periods of no current flowing in the resonant circuit in less time than setting an arbitrary value for the dead time interval. Instead, a determination can be made as to whether current is actually flowing in the resonant circuit and, if it is not, then one power switch can be turned off and the other turned on without dissipating power across a power switch. This is achieved by the control circuitry to be described herein. With fixed on time, during some loading conditions, such as a short circuit of the output, the current pulse will have a trailing edge such that substantial current will still be flowing through the resonant circuit when the power switches are actuated, i.e., one turned off and the other turned on. Energy will be dissipated at the power switches, which may result in component failure. As described in U.S. Pat. No. 4,648,017, the control 28 includes circuitry to ensure that the resonant current flow is at essentially a zero level before allowing the on switch to be turned off.

The resonant current $I_R$ flowing in the resonant circuit is sensed with a current sensing transformer 72 having primary winding 74 connected in the series resonant circuit and a secondary winding 76 connected to a wave shaping circuit. The wave shaping circuit includes a pair of oppositely poled clipping diodes 78 and 80 so as to develop a voltage across a resistor 82 representative of a processed or peak clipped current. This voltage is representative of the resonant current $I_R$ and is supplied as one input to the control 28.

In addition to sensing and processing the resonant current for use in controlling the switching of power switches 52 and 54, the control 28 also senses the average current $I_{AVE}$, as well as the output voltage $V_O$ for use in controlling the frequency of operation of the power switches. The output voltage $V_O$ is taken across the load which is on the secondary side of the power transformer 22. This power transformer 22 has secondary rectification taken from a pair of secondary windings 90 and 92, poled as shown, and interconnected with diodes 94 and 96 to maintain a constant charge across a capacitor 98 for supplying the load. The output voltage is taken across the load and is supplied to the control 28. As the load requirements increase because of a loading effect, the frequency of the current pulses in the resonant circuit will be increased.

Control 28 also monitors the average current flowing in the resonant circuit. If the average current is considered too high for proper usage of the FETs, then the frequency of supplying current pulses through the resonant circuit will be decreased to prevent destruction of the FETs. The average current may be sensed as with a current transformer 102 having a primary winding in series with the resonant circuit and its center tapped secondary winding connected to a rectifier circuit made up of Schottky diodes 104 and 106. A voltage representative of the average current $I_{AVE}$ may be developed across an output resistor 108. This voltage is supplied to the control 28.

Figure 3A:
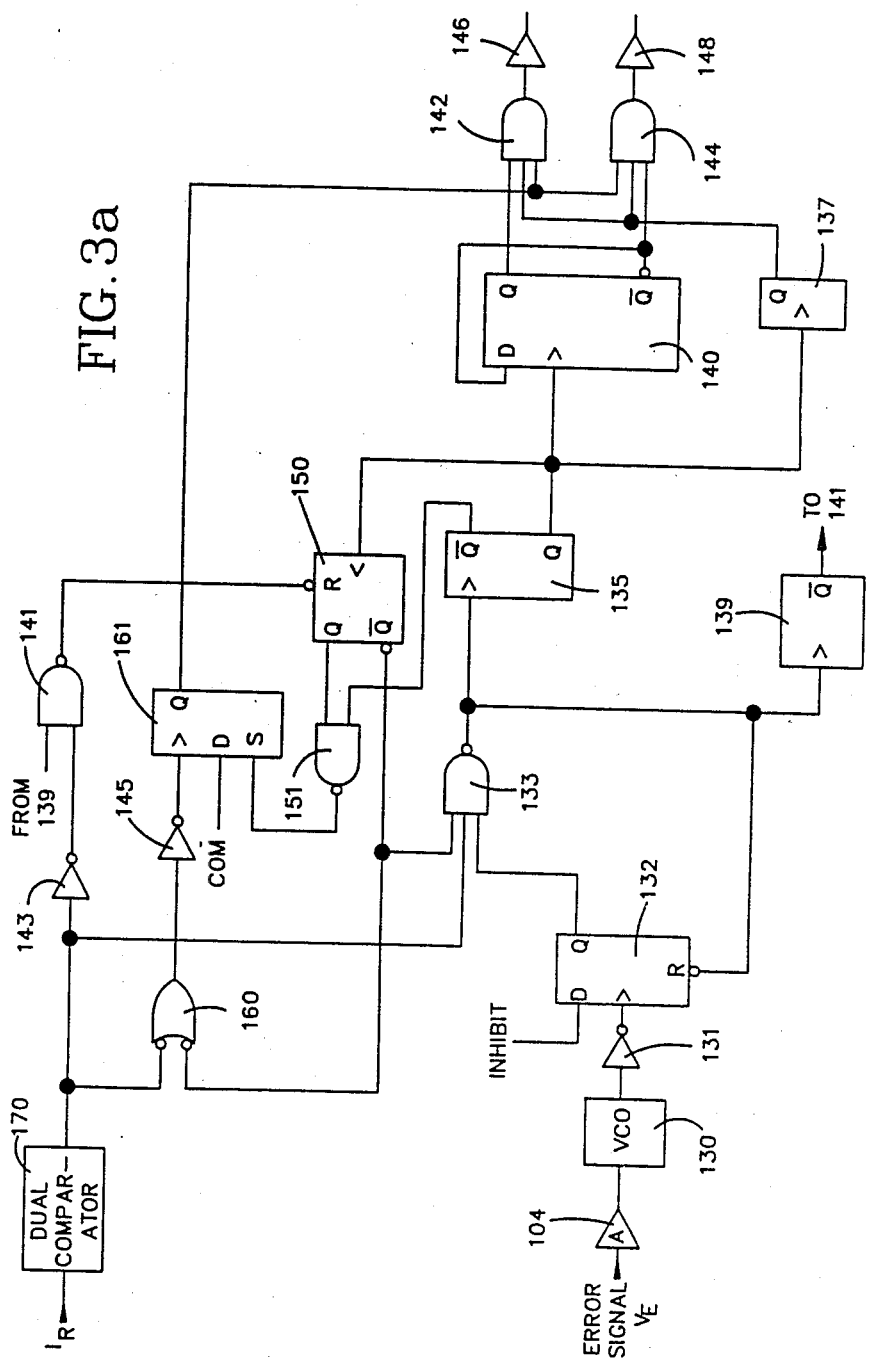
FIG. 3a is a schematic-block diagram illustration of a control for a series resonant power supply illustrating one embodiment of the invention herein.

Reference is now made to FIG. 3a which illustrates the control 28 and the driver circuit 30 in greater detail. Many of the circuit elements shown in FIG. 3a are identical to the circuit elements shown in FIG. 4 of U.S. Pat. No. 4,648,017. For ease of understanding the present invention those elements have the same reference numeral as the identical element in that figure.

The sensed output voltage $V_O$ is received by control 28 and is effectively compared (not shown) with a reference voltage $V_R$ to develop an error signal $V_E$, before being amplified by an amplifier 104 having a gain of A. The error signal $V_E$ is used to control the frequency at which current pulses are supplied to the series resonant circuit. This error signal is a DC voltage which may vary in magnitude from a negative value to a positive value. At its maximum positive value, it indicates that the output voltage $V_O$ is too high and should be reduced. In such case, the frequency of supplying current pulses is reduced. On the other hand, a negative error signal $V_E$ indicates that more power should be transferred and, hence, the frequency of supplying current pulses to the resonant circuit should be increased.

The error signal $V_E$ may be modified if the sensing circuit determines that the average current $I_{AVE}$ flowing through the resonant circuit is too high. In such a case, the frequency of supplying current pulses to the resonant circuit should be reduced to lower the value of the average current. For this reason, the average current is compared against a reference, and if it exceeds the reference, then the frequency of supplying pulses to the resonant circuit will be decreased by increasing the magnitude of the error signal $V_E$ in a positive direction. Otherwise, no change is made to the magnitude of the error signal.

Figure 4:
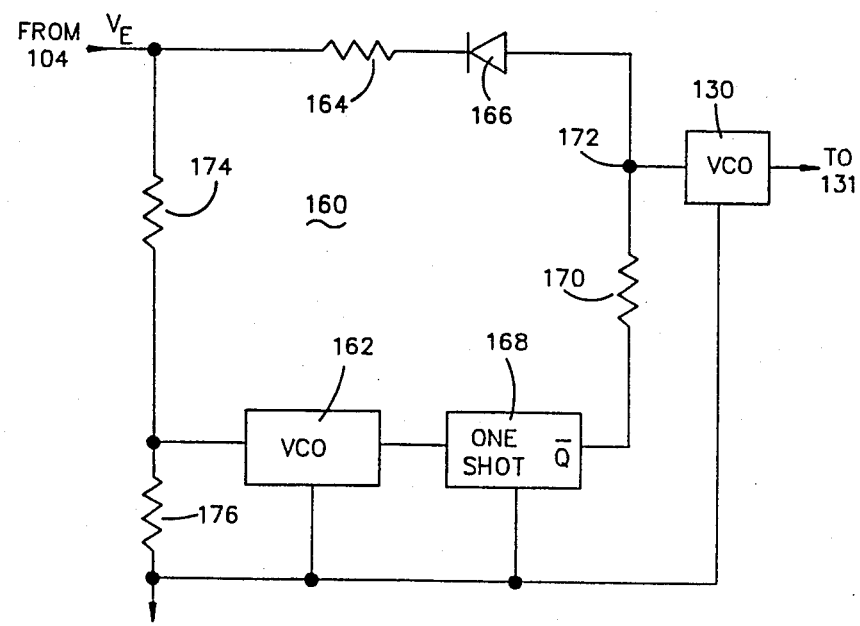
FIG. 4 is a schematic block diagram illustrating one embodiment for a circuit which functions to limit the operating frequency of the supply shown in FIG. 1 at light loads.

The sensed signal representative of the average current $I_{AVE}$ is actually a voltage signal representative of this current. The voltage representative of the average current is compared with a voltage $V_I$ representative of a current reference and the difference in voltage levels is amplified by a suitable amplifier (not shown). If the amplified difference voltage is positive, then, this is indicative that the average current exceeds the reference current. This positive voltage will be passed by a diode (not shown) as a positive input to a summing circuit (not shown) which receives the voltage reference $V_R$ as a negative input. The summed signal is amplified by an amplifier (not shown) having a gain of 1, and is supplied as a positive input to the summing node (not shown) to which the amplified output voltage is applied as a positive input. If the average current is greater than the reference current, then the effect of this is to increase in a positive direction the error signal $V_E$ so as to lower the frequency of supplying current pulses to the resonant circuit. If the average current is less than the reference current, then no voltage will be passed by the diode and no change will be made to the error signal $V_E$. Those circuit elements described above which are not shown in FIG. 3a are shown in FIG. 4 of the U.S. Pat. No. 4,648,017 and described therein.

The error signal $V_E$ is converted by a converter 130 so as to produce a squarewave pulse train having a frequency which varies inversely with that of the error voltage. The converter 130 may take the form of a typical voltage controlled oscillator (VCO). As discussed previously, the transfer characteristics are such that when the error signal $V_E$ is positive at its maximum value, the frequency of the pulses from converter 130 decrease to produce low power operation. However, as the error signal becomes less positive or more negative, then the frequency of the pulses from converter 130 increase to provide for higher power operation. It should be appreciated that while converter 130 has been described as converting the error signal voltage to a frequency it is a current controlled device. That is to say that it is a current to frequency converter. For ease of description I will continue to refer to it hereinafter as a converter. Those skilled in the art often refer to converter 130 as a VCO.

The operation of the control circuit of FIG. 3a will now be explained. For ease of explanation it is assumed that the FET which receives the gate driver pulse from AND gate 142 by way of buffer amplifier 146 is on. Therefore, the output of amplifier 146 is high. Of course, the FET which receives the gate driver pulse from AND gate 144 by way of buffer amplifier 148 is off and the output of that amplifier is low.

When the FET connected to amplifier 146 was first turned on, a positive going edge was received at one-shot 139. That edge caused the output of the one-shot 139 to go low for a fixed time duration. Simultaneously therewith the same positive going edge was received at one shot 135 causing it to generate a positive going pulse at its output. The Q output of one-shot 135 is connected to the input of one-shot 150 through elements (not shown) giving rise to a slight propagation delay. The positive pulse at the output of one-shot 135 caused one-shot 150 to fire. As set forth in U.S. Pat. No. 4,648,017, the period of one-shot 150 has been selected to be slightly greater than the resonant period, determined by the tank circuit. It is that one-shot which will permit operation of the converter 10 even if the resonant current detector circuit fails.

When the resonant current $I_R$ becomes zero, the output of dual comparator 170 becomes high. That high appears after passing through inverter 143 at one input of two input NAND gate 141 as a low. The other input to gate 141 is conencted to the Q output of one-shot 139. As described above, the output of that one-shot is low until the end of its fixed time duration. The output of gate 141 is connected to the reset (R) input of one-shot 150. The $\overline{Q}$ output of 150 is connected to one input of NAND gate 160. Until such time as one-shot 150 is reset its $\overline{Q}$ output is low resulting in a high out of gate 160. That high is connected to the trigger input of flip-flop 161 by an inverter 145.

Only when the output of gate 160 changes from a high to low will flip-flop 161 be triggered so that its Q output goes low. The D input to flip-flop 161 is connected to a low (circuit common). The Q output of flip-flop 161 is connected to one input of three input AND gate 142. As set forth above, it has been assumed that at the time the resonant current goes to zero the FET connected to amplifier 146 is on. Therefore, the output of gate 142 is high at that time. In order for the on FET to be turned off the output of gate 142 must go low. That will happen when the Q output of flip-flop 161 goes low and that can only happen (in the presence of a high out of comparator 170) only when one-shot 150 has been previously reset.

The mechanism for accomplishing that is obtained by setting the time duration of one-shot 139 to be less than that of one-shot 150. Zero resonant current should normally occur after one-shot 139 has timed out. The timing out of one-shot 139 with resonant current still flowing allows gate 141 to reset one-shot 150. The occurrence of zero resonant current thereafter allows the high out of comparator 170 to trigger flip-flop 161 so that its Q output goes low thereby causing the turn off of the on FET.

Setting of the time duration of one-shot 139 to be less than the normal time of occurrence of zero resonant current after the turn on of a FET prohibits the control circuit from causing the false resetting of the then on FET. Noise may occur anywhere on a resonant current pulse although its highest likelihood of occurrence is at the beginning of the pulse. The noise may be of sufficient amplitude and have a waveform such that comparator 170 may provide the high output signal indicative of zero resonant current. Without one-shot 139 and NAND gate 141 that high from comparator 170 may cause the control circuit to prematurely turn off the on FET. Such a premature turnoff in response to noise in the resonant current endangers the operation of the FETs by causing them to switch current. That is not the intended mode of FET operation.

The turn-on of one-shot 139 at the same time that a FET is turned on insures that the premature occurrence of zero resonant current does not turnoff that FET. The on FET is turned off only upon the occurrence of both zero resonant current and one-shot 139 being timed out.

In a converter constructed in accordance with the present invention the time duration of one-shot 139 was set at 2.5 usec. and the time duration of one-shot 150 was set at 3.2 usec. The normal width of the series resonant pulses was set, by proper selection of the components used in the resonant tank circuit, to be greater than the duration of one-shot 139 but less than the duration of one-shot 150.

The turn-on of the off FET will now be discussed. In order to provide a signal to turn on that FET, i.e., the FET which in our example is connected to receive the signal from amplifier 148, AND gate 144 must be enabled. That gate has three inputs and all must go high for it to be enabled. One input is connected to the Q output of flip-flop 161 which was reset as described above. That flip-flop must be set so that its output goes high. A second input is connected to the Q output of flip-flop 140. As the FET connected to receive the signal from amplifier 146 was previously on, flip-flop 140 has its Q output high and its Q output low. The flip-flop must then be triggered so that Q output becomes high and the Q output becomes low. The third input is connected to the Q output of one-shot 137, which as explained hereinafter, has a long time duration and should in normal operation of converter 10 continuously receive signals at its input to keep it from timing out.

The output of converter 130 is connected by an inverter 131 to the clock input of a flip-flop 132 whose D input is connected to an INHIBIT signal. In normal operation of converter 10 the INHIBIT signal is always positive. Consequently, when the output voltage of converter 130 goes low the Q output of flip-flop 132 goes high. The Q output is connected to one of the inputs of three input NAND gate 133. The other two inputs to gate 133 are connected, respectively, to comparator 170 and the Q output of one-shot 150 both of which are high at this time. The output of gate 133 goes low to thereby reset flip-flop 132. The Q output of the flip-flop goes low and consequently the output of gate 133 goes high. Propagation delays in the driver circuit 30 (not shown) following amplifiers 146 and 148 necessitate the inclusion of a controlled delay between the inception of a pulse at converter 130 and the appearance of a pulse at the amplifiers. This delay occurs at one-shot 135.

The going high of the output of gate 133 clocks one-shot 135 and one-shot 139. The Q output of one-shot 135 is connected to the clock input of flip-flop 140 and to the clock input of one-shot 137. Therefore, the clocking of one-shot 135 causes a positive going pulse to appear at its Q output which in turn clocks one-shot 137 and flip-flop 140. The clocking of the flip-flop causes its $\overline{Q}$ output to go high. The clocking of one-shot 137 keeps its Q output high. Thus, the clocking of one-shot 135 has provided two of the three needed high inputs to gate 144.

The Q output of one-shot 135 is also connected to the clock input of one-shot 150. The going high of that input clocks one-shot 150. The $\overline{Q}$ output of one-shot 135 and the Q output of one-shot 150 are connected to the associated inputs of NAND gate 151. With both one-shots clocked, the output of gate 151 is high. That output is, however, connected to the set (S) input of flip-flop 161, which as described above, had been clocked to turn off the then on FET. Flip-flop 161 must be set in order to provide the third high input to gate 144. To do that the input of the flip-flop must receive a low signal from gate 151.

In order for the output of gate 151 to go low, both of its inputs must be high. To accomplish that result and to insure a turn-on of the off FET within a controlled duration after the output of converter 130 has reached a high voltage, the time duration of one-shot 135 is selected to be short compared to the time duration of all of the other one-shots. At the end of that short duration, one-shot 135 times out and its $\overline{Q}$ output goes high. The output of gate 151 goes low setting flip-flop 161, thereby enabling gate 144. The signal to turn on the off FET is then transmitted to the FET connected to receive the signal from amplifier 148.

As set forth above, the time duration of one-shot 135 has been selected to be extremely short as compared to the time duration of the other one-shots in control 28. One-shot 135 provides a minimum dead time between the occurrence of pulses from driver circuit 30. Therefore, a pulse to turn on the off FET cannot be generated any sooner after the turn-off of the on FET than the time duration of one-shot 135. In a converter 10 constructed in accordance with the present invention the time duration of one-shot 135 was set at 300 nsecs., with the time duration of one-shots 141 and 150 being 2.5 usecs. and 3.2 usecs., respectively.

The flip-flop 161 prevents a false turning on of either FET until the next clock pulse. As described above, that flip-flop is clocked to have its Q output low when the resonant current is zero and one-shot 150 has been timed out by being reset through gate 141. Gate 142 is then blocked and the FET which has been just turned off cannot be turned on by an erroneous signal in the control circuit 28, especially noise detected by comparator 170. In addition, the flip-flop must be set in order to turn on the off FET and that can only occur upon the receipt of the next clock pulse from converter 130.

Finally, one-shot 137, which has an extremely long time duration, provides an assurance that the transformer (not shown) which is part of driver circuit 30 will not saturate due to the occurrence of an inordinately long drive pulse. Saturation of the drive transformer may cause the on FET to go into the linear mode. In converter 10 the FET's are operated in the switching mode. Operation of the FET's in the linear mode may lead to disastrous consequences.

As described above, that one-shot is triggered each time a clock pulse is received from converter 130. In normal operation of control circuit 28 the clock pulses are received at time intervals which are less than the time duration of one-shot 137. The retriggering of the one-shot each time a clock pulse occurs prevents the one-shot from timing out. If the one-shot were to time out its Q output which is connected to gates 142 and 144 would go low to block those gates and thereby turn off the on FET by turning off the drives pulse to that FET.

As described above in connection with FIG. 3a, the INHIBIT signal at the D input to flip-flop 132 is always positive when supply 10 is operating normally. This signal must be positive in order for the flip-flop to set when the output of converter 130 goes low. It is the setting of the flip-flop which is the first step in the sequence leading to the generation from driver 30 of the signal to turn on the off FET. If the INHIBIT were negative then the flip-flop 132 could not be set and the off FET could not be turned on. In that case supply 10 would cease to provide power at its output.

Upon the occurrence of certain conditions it will become necessary to shutdown supply 10. These conditions may arise when for example the user of supply 10 decides to shutdown the supply by turning off the A.C. input voltage or when that voltage becomes either too high or too low in amplitude as compared to predetermined upper and lower limits on the amplitude or when one phase of the three phase A.C. input voltage is lost. For the above conditions it is not only desirable that supply 10 be shutdown but that that shutdown be done in an orderly manner.

In particular, it is extremely important that the supply 10 be shutdown upon the occurrence of any one of the above conditions only after the then on FET has been turned off in response to the resonant current going to zero. If the FET were to be turned off when the current was not zero, the FET would switch current. This is not the intended mode of operation of FETs 52 and 54. The INHIBIT signal can be used upon the occurrence of any one of the above conditions to ensure that the shutdown occurs only after the on FET has been properly turned off.

It should be appreciated that the occurrence of any one of the above conditions will not give rise to an instantaneous shutdown of supply 10. Rather, that occurrence will cause the A.C. input voltage to be turned off. At some time thereafter the supply 10 will shutdown. The odds are quite high that that shutdown will, unless otherwise controlled, occur during the on time of a FET. The INHIBIT signal can be used to ensure that it does not.

Figure 3B:
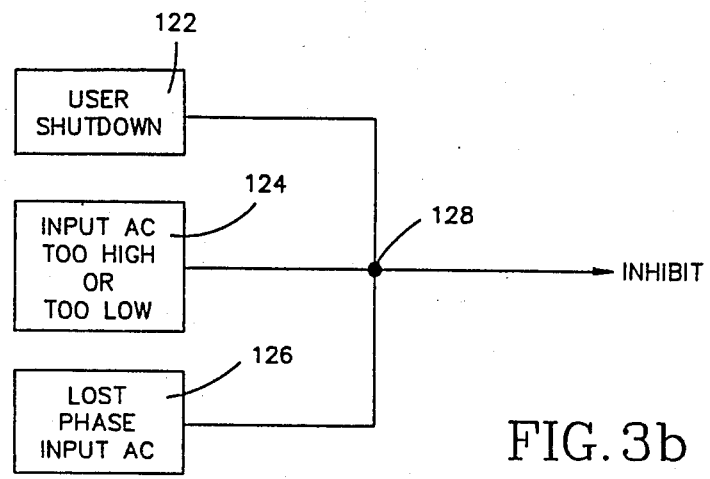
FIG. 3b is a block diagram illustrating the various conditions the occurrence of which give rise to the orderly shutdown of the series resonant power supply.

Referring now to FIG. 3b there is shown in block diagram form an embodiment for the circuitry which is used to generate the INHIBIT signal. Under normal operating conditions that signal is positive. It is, however, desired that upon the occurrence of anyone of the conditions described above that the INHIBIT signal become negative. Block 122 represents the condition of the shutdown of supply 10 by the user. Block 124 represents the condition of the shutdown of supply 10 as a result of the A.C. input voltage being either too high or too low in amplitude. Block 126 represents the condition of the shutdown of supply 10 as a result of losing one phase of the A.C. input voltage. The outputs of blocks 122, 124 and 126 are or'd together at junction 128. The occurrence of any one of the three conditions causes the INHIBIT signal to become negative.

Referring once again to FIG. 3a, the going negative of the INHIBIT signal prevents flip-flop 132 from becoming set when the output of converter 130 next goes low. The then off FET cannot be turned on. The FET which was on when the condition occurred is turned off when the resonant current goes to zero. As the FET which is off cannot be turned on, the supply 10 will be shutdown.

While specific embodiments have not been shown in FIG. 3b for blocks 122, 124 and 126 they are well known to those skilled in the art. For example, block 122 may have its input in effect connected to the circuit breaker for the input A.C. voltage. The turning off of that breaker by the user will generate a signal and block 122 may include the necessary circuitry to respond to that signal in order to generate the negative INHIBIT signal. Block 124 may be embodied in the form of two comparators. One input of each comparator is connected to a signal representative of the A.C. input voltage. The other input of one of the comparators is connected to a signal representative of a desired upper limit to that voltage whereas the other input of the other comparator is connected to a signal representative of a desired lower limit for that voltage. The outputs of the two comparators are or'd together. The presence of each phase of the A.C. input voltage may be represented by a logic level. Block 126 may then be embodied by a logic element and associated circuitry such the loss of any one of the phases gives rise to the negatiave INHIBIT signal.

As described in connection with FIG. 2, the control 28 turns on FETs 52 and 54 at a rate which depends on the load at the output of supply 10. At low power output, also known as light loading conditions, the resonant current pulses will occur at a relatively low frequency. If the loading conditions are light enough that frequency may become low enough such that it falls within the audible range of frequencies. The audible band of frequencies on a telephone line, also known as the telephone voice band, is in the range of 300 Hz to 3400 Hz. If supply 10 is used as a battery charger, its operation at a relatively low frequency may give rise to audible noise on the telephone lines supplied voltage and current by the batteries. Therefore, it is desirable to provide circuitry in control 28 which limits the operating frequency of supply 10 at light loads such that it does not fall within the telephone voice band.

Referring now to FIG. 4, there is shown the schematic diagram for a circuit 160 which functions to limit the operating frequency of supply 10 at light loads in the manner described above. Circuit 160 is a part of control 28. As will be described hereinafter in more detail, circuit 160 functions at light loads to provide an input signal to converter 130 in place of that provided at all other, i.e., heavier, loading conditions. In response to that signal converter operates at a fixed frequency of 5 KHz. FIG. 4 shows only circuit 160 and converter 130 as the remainder of control 28 is identical to that which has been previously described.

Circuit 160 includes a converter 162 which is identical to converter 130, i.e., it is also a current controlled device. The error signal voltage $V_E$ is an input signal to both converter 130 and converter 162. It is connected from the output of an amplifier (104 of FIG. 3) to the input of converter 130 by the series combination of resistor 164 and diode 166. If control 28 did not include the operating frequency limiting circuit 160, then the error signal voltage would be connected directly to the input of converter 130 from the output of amplifier 104 as shown in FIG. 3a. Circuit 160 also includes one-shot circuit 168 the input of which receives the output of converter 162. The output of one-shot circuit 168 is connected by resistor 170 to the input of converter 130.

The operation of circuit 160 and converter 130 will first be described for those loading conditions at the output of supply 10 which are heavier than a light load condition and then for a light load condition. For such heavier loads, the error voltage signal appears at both the input to converter 130 and the input to converter 162. While converters 130, 162 are both identical they operate at different frequencies in response to the error voltage signal. As described above, the input of one-shot circuit 168 receives the signal generated at the output of converter 162.

Circuit 168 is a retriggerable one shot which in response to the triggering signal from converter 162 generates a pulse having a fixed duration of 50 msecs. Each time one-shot circuit 168 receives the triggering signal from converter 162 it restarts the 50 msec. time duration. If the triggering signals are received at a rate which is faster than once every 50 msecs., the output of circuit 168 is no longer a pulse but rather a constant voltage level. For heavier loads, the triggering signals occur at a rate which is faster than once every 50 msecs. Therefore, for such loads the output of circuit 168 is a constant voltage level rather than a pulse.

More particularly it is the Q output of circuit 168 which is connected to the input of converter 130 by resistor 170. For heavier loads, the constant voltage level on that output is 0 (zero) volts. That voltage is or'd at junction 172 with the error signal voltage which is connected to the input of converter 130 by the series combination of resistor 164 and diode 166. For such heavier loads, it is the error signal plus the constant output of one-shot circuit 168 which is the input signal for converter 130. Therefore, for such heavier loads supply 10 operates at a frequency which is directly related to the load.

As the load on the output of supply 10 becomes lighter, the error signal voltage becomes more positive in amplitude. When it reaches an amplitude, which is determined essentially by the internal source voltage of converter 130, the error signal voltage is disconnected by means of diode 166, from junction 172, i.e., the input to converter 130. Converter 130 and therefore the operating frequency of supply 10 are now directly under the control of the voltage generated at the $\overline{Q}$ output of one-shot circuit 168.

As described above at heavier loads, the voltage level at that output of circuit 168 is a constant zero volts. In response to that voltage level, converter 130 would function to generate a 5 KHz signal. I have designed circuit 160 such that when the error signal is disconnected from the input to converter 130, the output voltage level from one-shot circuit 168 is a constant zero volts rather than pulses. This is simply a matter of design choice. The operating frequency of converter 162 is dependent upon 174 and 176. I could have designed circuit 160 such that at the time the error signal voltage was so disconnected the output of circuit 168 were pulses each having a 50 msec. duration and separated by a very short time interval. For either design, the voltage level at the input of converter 130 at the time the error signal voltage is disconnected from the converter input is essentially a constant level of zero volts.

As the load becomes lighter, the error signal voltage becomes more positive. The frequency of the output signal of converter 162 becomes lower than that required to maintain the $\overline{Q}$ output of one-shot circuit at a constant zero voltage level. In other words, the triggering signals at the input to circuit 168 will no longer occur at a rate which is faster than the 50 msec. duration of the pulse generated by circuit 168 in response to each triggering signal. There will now appear at the Q output of circuit 168 a signal made up of negative going pulses each of 50 msec. duration and separated from each other by a time interval which varies with load. As the load becomes lighter, the separation time interval will increase. In any case, the voltage level at the Q output of circuit 168 is zero volts when a pulse is generated and some positive voltage (such as 5 volts) when no pulse is generated, i.e., during the separation time interval.

In response to the pulse train signal from the Q output of circuit 168, converter 130 will generate a 5 KHz signal when the pulse is present and no signal during the separation time interval. Supply 10 will then operate at 5 KHz for the 50 msec. duration of each pulse and will have no operating frequency during the separation time interval. I call this the burst mode of operation. The 50 msec. on time determines a maximum 20 Hz fundamental frequency for the burst pulses. Therefore, for light loads the operating frequency of supply 10 will be either above or below the telephone voice band. Thus the circuit 160 of the present invention controls the operating frequency of supply 10 such that the supply does not give rise to audible noise on the telephone lines at light loads.

It is to be understood that the description of the preferred embodiments is intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. A control circuit for use in a series resonant power supply of the type which supplies regulated power to an output circuit from an unregulated input voltage, said power supply including a series resonant circuit having first and second switching means, each of said switching means actuable on and off, only one of said switching means being on at any one time, said series resonant circuit producing a resonant current when said switching means are alternately actuated on and off, said circuit comprising:
   (a) driver means for generating signals for actuating said switching means on and off;
   (b) means connected to said driver means for causing said driver means to actuate on one of said switching means depending on loading conditions at said output circuit;
   (c) means connected to said driver means for causing said driver means to actuate off that one of said switching means which is then on only when said resonant current amplitude becomes essentially zero; and
   (d) means connected to both said on actuating means and said off actuating means and responsive to said on actuating means causing said driver means to actuate on one of said switching means for preventing said off actuating means from causing said driver means to actuate off said then on switching means for a predetermined period of time even if said resonant current amplitude becomes essentially zero during said predetermined time period.

2. The control circuit of claim 1 further comprising first timing means connected to both of said on actuating means and said off actuating means and responsive to said on actuating means causing said driver means to actuate on one of said switching means for generating a signal which terminates after a predetermined time period, said off actuating means responsive to said resonant current amplitude becoming essentially zero after said preventing means predetermined time period ends for prematurely terminating said first timing means signal predetermined time period such that said off actuating means can cause said driver means to actuate off said then on switching means, said off actuating means responsive to said first timing means signal terminating after said predetermined time period for causing said driver means to actuate off that one of said switching means which is then on.

3. The control circuit of claim 2 wherein said series resonant circuit has a selectable resonant current time period which is selected to be greataer than said preventing means predetermined time period but less than said first timing means signal predetermined time period such that said resonant current amplitude ordinarily becomes essentially zero after said preventing means predetermined time period terminates and before said first timing means signal predetermined time period terminates.

4. The control circuit of claim 1 further comprising means responsible to said unregulated input voltage for determining when said voltage exhibits any one of a predetermined number of undesirable conditions, said means generating a signal indicative thereof and said on actuating means including means responsive to said indicative signal for inhibiting said on actuating means from causing said driver means to actuate on one of said switching means.

5. The control circuit of claim 2 further comprising means responsible to said unregulated input voltage for determining when said voltage exhibits any one of a predetermined number of undesirable conditions, said means generating a signal indicative thereof and said on actuating means including means responsive to said indicative signal for inhibiting said on actuating means from causing said driver means to actuate on one of said switching means.

6. The control circuit of claim 2 wherein said control circuit is responsive to said output circuit loading conditions for generating a signal representative thereof and said on actuating means includes second timing means responsive to said representative signal for generating a signal which terminates after a predetermined time period, said on actuating means further including means connected to said driver means and responsive to said off actuating means causing said driver means to actuate off that one of said switching means which is then on for entering a first output state which inhibits said driver means from actuating on one of said switching means, said means responsive to said second timing means signal terminating after said predetermined time period for ending said first output state.

7. The control circuit of claim 6 wherein said on actuating means further includes third timing means responsive to said second timing means signal for generating a signal having a predetermined extremely long time period, said third timing means signal connected to said driver means, said second timing means signal usually occurring at a frequency such that said third timing means signal does not ordinarily terminate, said third timing means signal termination causing said driver means to actuate off that one of said switching means which is then on.

8. A control circuit for use in a series resonant power supply of the type which supplies regulated power to an output circuit from an unregulated input voltage, said power supply including a series resonant circuit having first and second switching means, each of said switching means actuable on and off, only one of said switching means being on at any one time, said series resonant circuit producing a resonant current when said switching means are alternately actuated on and off, said circuit comprising:
  (a) driver means for generating signals for actuating said switching means on and off;
  (b) means connected to said driver means for causing said driver means to actuate off that one of said switching means which is then on only when said resonant current amplitude becomes essentially zero;
  (c) means responsive to said unregulated input voltage for determining when any one of a predetermined number of undesirable conditions occurs in said voltage, said means generating a signal indicative thereof; and
  (d) means connected to said driver means for causing said driver means to actuate on one of said switching means depending on loading conditions at said output circuit, said on actuating means including means responsive to said indicative signal for inhibiting said on actuating means from causing said driver means to actuate on one of said switching means.

9. The control circuit of claim 8 further comprising means connected to both said on actuating means and said off actuating means and responsive to said on actuating means causing said driver means to actuate on one of said switching means for preventing said off actuating means from causing said driver means to actuate off said then on switching means for a predetermined period of time even if said resonant current amplitude becomes essentially zero during said predetermined time period.

10. The control circuit of claim 8 wherein said undesirable conditions determining means comprises at least first means for determining if said unregulated input voltage has an amplitude which either exceeds a predetermined first amplitude or falls below a predetermined second amplitude and generating a first signal indicative thereof, said first predetermined amplitude being greater than said predetermined second amplitude.

11. The control circuit of claim 10 wherein said undesirable conditions determining means further comprises second means for determining if said unregulated input voltage has been turned off and generating a second signal indicative thereof, said undesirable conditions occurring indicative signal being either said first indicative signal or said second indicative signal.

12. A control circuit for use in a series resonant power supply of the type which supplies regulated power to an output circuit from an unregulated input voltage, said power supply including a series resonant circuit having first and second switching means, each of said switching means actuable on and off, only one of said switching means being on at any one time, said series resonant circuit producing a resonant current when said switching means are alternately actuated on and off, said supply also including means for generating a signal representative of loading conditions at said output circuit, said circuit comprising:
  (a) driver means for generating signals for actuating said switching means on and off;
  (b) means connected to said driver means for generating an actuating signal for causing said driver means to actuate on one of said switching means, said on actuating means having an input;
  (c) low power control means having an input and an output, said output connected to said on actuating means input; and
  (d) circuit means for connecting said loading conditions representative signal to said on actuating means input and said low power control means input, said circuit means disconnecting said representative signal from said on actuating means input when said loading conditions are at or below a predetermined level, said on actuating means responsive to said representative signal for generating said actuating signal at a frequency dependent on said loading conditions, said low power means responsive to said representative signal for generating a signal having an essentially constant predetermined amplitude when said loading conditions are above said predetermined level and pulses of a predetermined width and amplitude when said loading conditions representative signal falls below said predetermined level, said on actuating means responsive to said pulses for generating said actuating signal with a fixed time duration.

13. The control circuit of claim 12 further comprising means connected to said driver means for causing said driver means to actuate off that one of said switching means which is then on only when said resonant current amplitude becomes essentially zero.

* * * * *